June 3, 1941.　　　　　R. F. BEERS　　　　　2,244,484
METHOD OF AND MEANS FOR ANALYZING AND DETERMINING THE GEOLOGIC
STRATA BELOW THE SURFACE OF THE EARTH
Filed May 7, 1938　　　　2 Sheets-Sheet 1
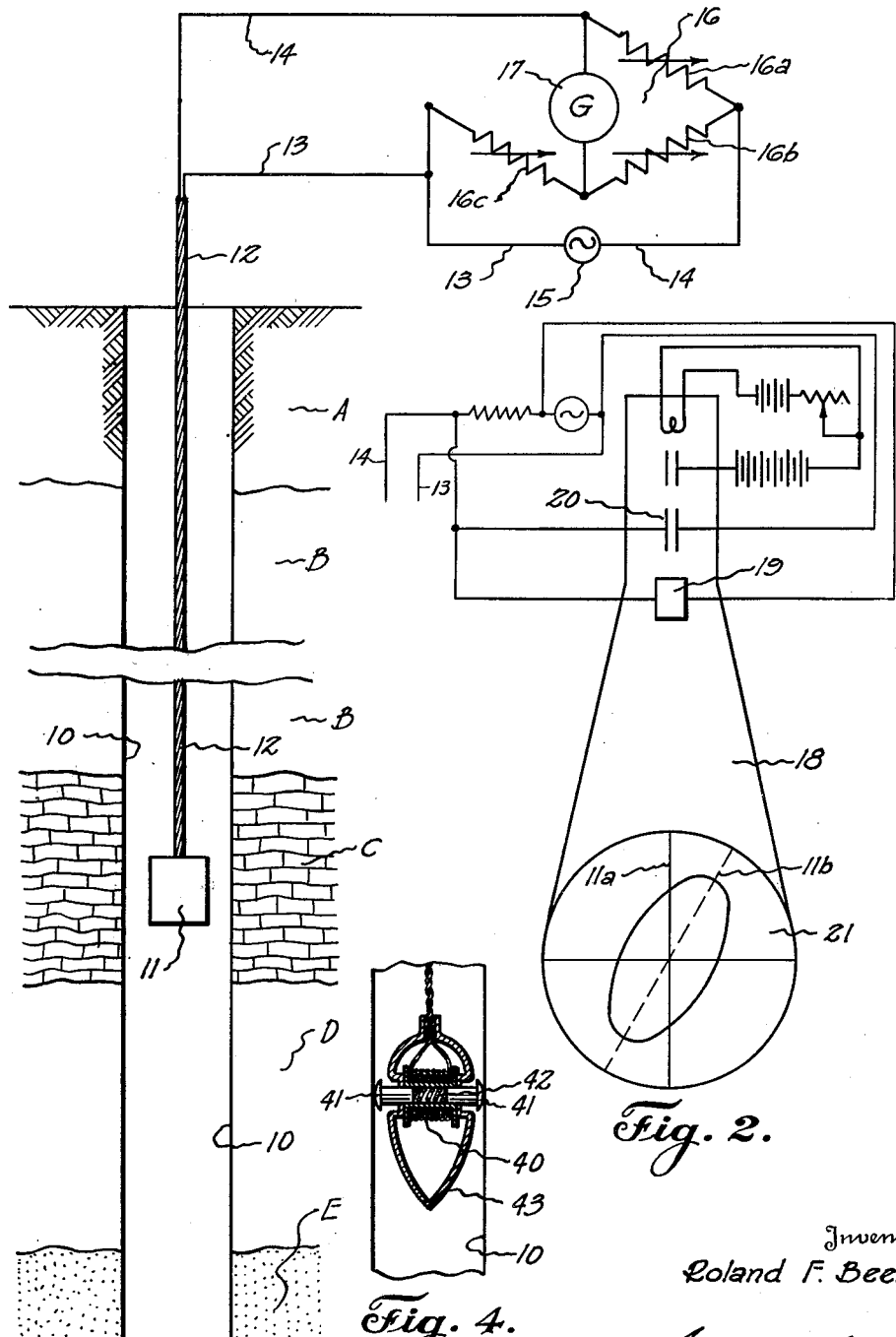

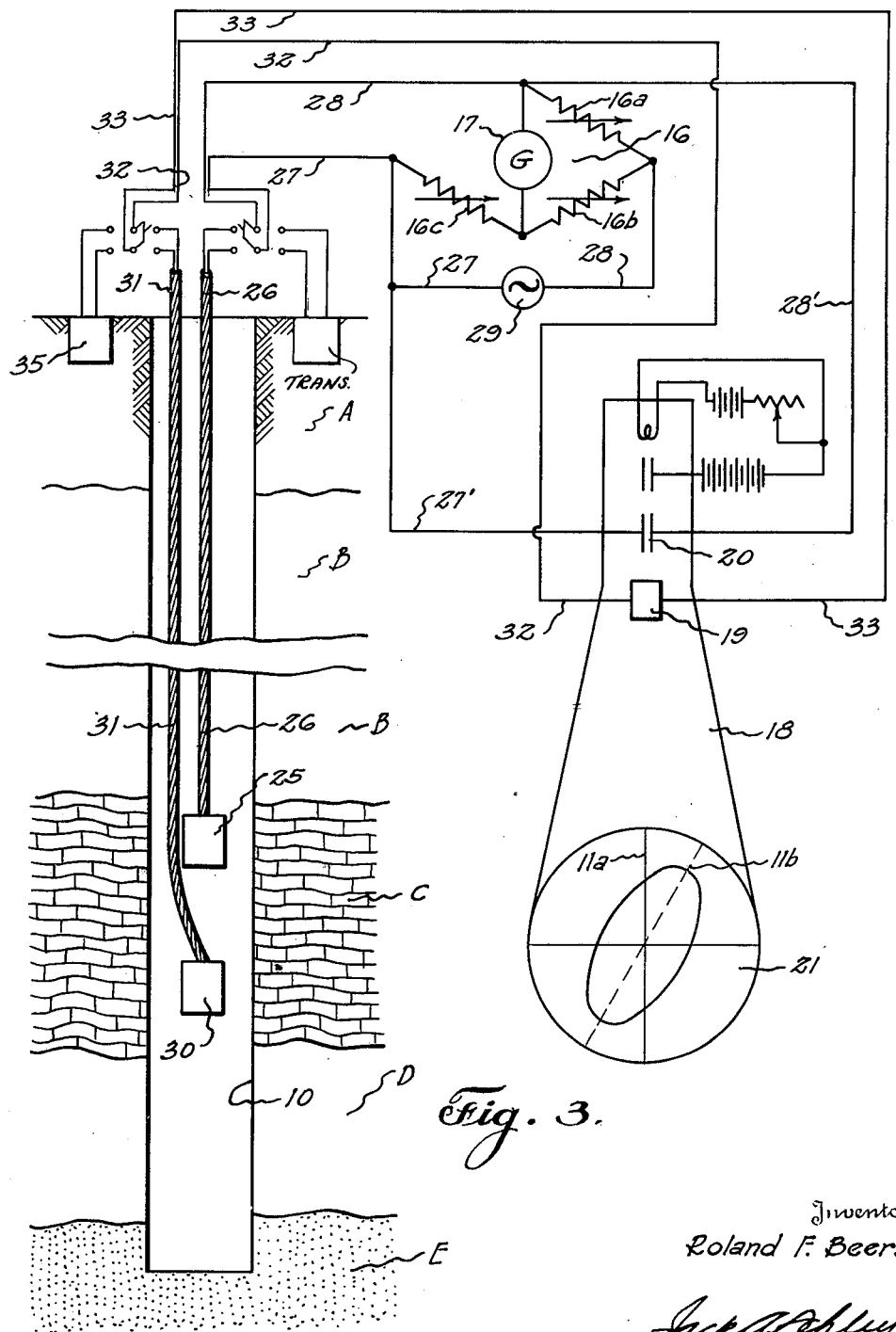

Patented June 3, 1941

2,244,484

UNITED STATES PATENT OFFICE 2,244,484

METHOD OF AND MEANS FOR ANALYZING AND DETERMINING THE GEOLOGIC STRATA BELOW THE SURFACE OF THE EARTH

Roland F. Beers, Dallas, Tex.

Application May 7, 1938, Serial No. 206,662

2 Claims. (Cl. 181—0.5)

This invention relates to new and useful improvements in methods of and means for analyzing and determining the geologic strata below the surface of the earth.

By the term "analyzing," as used herein and in the appended claims, is meant determining any of the physical properties of the formation or strata, whereby the nature and identity of the formation may be inferred.

In the search for deposits of petroleum and minerals it is commonly the practice to determine by correlation the relation of a series of geologic strata below a given point on the surface of the earth to the same series of strata below another point removed at some distance. Correlation of a recognizable series of strata is primarily a geological problem which depends for its success upon a knowledge of the many different properties of the strata under consideration. These properties become the points of differentiation in the establishment of a sequence of strata which when recognizable at points distant from the one under consideration fixes the correlation uniquely.

The points of differentiation upon which these correlations are based may be geologic, paleontologic and lithologic, in which cases they are problems proper to the field of the geologist who establishes the bases of correlation by minute examination of cuttings taken from a drilling well.

Instances have arisen where the points of differentiation based on the foregoing methods have been inadequate for the establishment of a unique correlation. In such cases resort has been had to other methods such as by the measurement of the electrical resistivity of formations in situ. Even the use of this method leaves much to be desired and it is one of the objects of this invention to provide an improved method of accurately analyzing and determining characteristics of geologic strata below the earth's surface by means of seismic or sound waves.

An important object of the invention is to provide an improved method wherein sound or seismic waves are produced in the vicinity of the formation so as to be transmitted into said formation, and the velocity of propagation of said waves through the formation is accurately determined, which information indicates the character of the formation.

Another object of the invention is to provide an improved method of seismically determining physical characteristics of subsurface formations which includes, generating a sound in the vicinity of a formation and transmitting the same into the formation by means of an electrical acoustic generator, the electrical quantities of which, measured at its terminals, depend upon the extent to which the power delivered to the generator is absorbed by the surrounding or adjacent formations, whereby variations in the measured electrical quantities indicate changes in the physical and lithologic characteristics of the various formations; said measurements being recorded by a graphical plot or log, or other means, at each successive position in the geologic section as a basis of correlation.

A further object of the invention is to provide an improved method of seismically determining changes in physical characteristics of geologic strata which includes, setting up sound waves in the immediate vicinity of the formation or stratum, measuring the velocity of propagation of the sound through the formation and indicating the same at the surface, whereby characteristics of the formation may be readily determined by the time required for the waves to travel through the formation.

A particular object of the invention is to provide an improved method of analyzing subsurface formations which includes, lowering an acoustic generator into a bore extending through the formation, whereby sound may be generated in the vicinity of the formation and transmitted therethrough, receiving the sound travelling through the formation with a second unit also disposed within the bore in proximity to the generator, and measuring the time elapsed during the travel of the sound from the generator to the receiving unit, whereby the velocity of propagation of the sound together with the specific acoustic impedance of the formation may be ascertained to indicate the nature of the formation.

Experiments have proven that certain types of geologic formation exhibit frequency selectivity in that they exert a preference for sound waves of certain frequencies and discriminate against waves of other frequencies. These experiments have also shown that the spectral distribution of such frequency selectivity can be correlated with the physical and lithologic properties of the formation. Therefore, the method, herein disclosed, may be utilized for making a frequency run in the vicinity of one formation to ascertain the sound transmission characteristics of said formation at the various frequencies, whereby the physical and lithologic properties of the formation are indicated.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a diagrammatical view of an apparatus for carrying out the invention, Figure 2 is a schematic view of an ordinary cathode ray oscillograph, which may be used for taking the measurements, Figure 3 is a view similar to Figure 1 of a modified form of apparatus, which may be employed in carrying out the method, and Figure 4 is a transverse, vertical, sectional view of a modified form of transmitter.

In the drawings, the numeral 10 designates a bore drilled through the subsurface formations or strata of the earth. As shown, the bore extends successively through the weathered layer A, consisting of soil and other unconsolidated materials, the layer B of shale, layer C of limestone and another layer D of shale, and finally a layer E of sandstone. These layers have been shown symbolically and have been arbitrarily chosen, merely for the purpose of illustration; manifestly, the particular locality in which the bore 10 is drilled determines the geologic section encountered.

In carrying out the invention for the purpose of investigating the various layers, a seismic oscillator or acoustic generator 11 is lowered into the bore on an electric cable 12. This generator may take the form of an electromagnetic oscillator, of the usual type now in general use, or any other similar electromagnetic device, whereby when an alternating current of frequency is impressed upon said oscillator, a sound will be generated. A sound generator such as disclosed in Letters Patent No. 1,525,182, issued to Harvey C. Hays, would be suitable for the purposes. It is noted that the frequency impressed upon the oscillator be variable whereby a desired frequency may be employed. Manifestly, when the oscillator 11 is lowered in the bore 10, it is located adjacent to, or in the immediate vicinity of one of the layers of the formation and the sound generated thereby is transmitted into said formation.

In some instances, the bore 10 may be filled with a drilling fluid, such as a mixture of heavy mud and water and if the oscillator 11 is lowered into this drilling fluid, the sound waves generated thereby are transmitted through the fluid into the adjacent geologic formation. When a drilling fluid is not present in the bore, the oscillator may be attached directly to the wall of the formation in any suitable manner.

It is well known that when an electromagnetic oscillator is excited by means of the appropriate alternating current, its impedance, which is the ratio of the magnitude of the applied voltage to the current delivered thereto, is dependent upon the extent to which the power delivered to the oscillator is absorbed by the medium surrounding th device. For example, if the oscillator 11 were suspended in mid-air and suitably excited, the power absorbed by the surrounding air medium would be relatively small and the measured impedance across the terminals of the oscillator would be correspondingly large. However, if the oscillator was submerged in a fluid, buried in the earth, the absorption of sound by the surrounding medium would be increased, with the result that the measured impedance would be smaller. Thus, the measured impedance across the terminals of the oscillator is a measure of the amount of power absorption by the medium surrounding said oscillator. This power can be readily translated into terms of the specific acoustic impedance of the medium surrounding the oscillator which is a well known recognizable property of all media of sound transmission. Since the specific acoustic impedance of a medium is a function of the velocity of propagation of sound waves travelling through the medium and since the velocity of propagation of sound waves varies with the lithologic and physical properties of the medium, it is manifest that by measuring the impedance across the terminals of the oscillator 10 and thus determining the acoustic impedance of the medium, it is possible to determine the velocity of propagation of sound waves through the medium and thereby ascertain said properties of the formation.

The oscillator 11 is attached to the lower end of the electric cable 12 which may be lowered into the bore by any suitable means, such as a drum (not shown). The oscillator is lowered to successive positions in the bore and at each position, said oscillator is excited by an alternating current which is delivered thereto by wires or conductors 13 and 14, which lead from an alternator 15 of the usual construction, said alternator generating the desired alternating current. The wires extend downwardly through the cable 12 and are connected to the terminals of the oscillator 11, whereby the alternating current excites the electromagnet of said oscillator to develop sound waves which are transmitted from the oscillator into the adjoining formation.

As has been explained, the amount of power which the oscillator will absorb under specified terminal voltage varies considerably with the nature of the medium surrounding said oscillator and this power may be expressed in terms of the effective impedance measured at the terminals of the oscillator. By correlating the changes in power delivered and/or in impedance with the types of formation, it is possible to derive properties of the formation adjacent the oscillator at the time the measurement is taken, and to establish a sequence of variations which can be correlated.

Various well known instruments and methods may be employed in obtaining these measurements of power delivered to the oscillator and of the impedance across the terminals. One method is disclosed in Figure 1 wherein an impedance bridge 16, shown schematically, is connected to the terminal wires 13 and 14. The bridge includes three adjustable impedances 16a, 16b and 16c, the first being directly connected in the wire 14. The second impedance 16b has one terminal attached to one terminal of the impedance 16a, with its other terminal attached to one side of the impedance 16c. This latter impedance is connected to the wire 13. An indicating galvanometer 17 is connected to the wire 14 and also to the point of connection between the impedances 16b and 16c.

With such arrangement, the alternator 15 is connected in the measuring circuit and a portion of its power is delivered through the conductors 13 and 14 to the oscillator 11. The impedance of the oscillator, which varies in accordance with the medium surrounding the same, is measured by the impedance bridge. Manifestly, since the impedance varies in accordance with the formation surrounding the oscillator, a different impedance measurement is made as the oscillator moves from one formation to the next.

In using the device, the oscillator 11 is first lowered into the bore, preferably opposite the lowermost layer. The alternator 15 is operated to excite the electromagnet of the oscillator with a current of suitable frequency and a sound is generated and transmitted into the layer or stratum. The impedance across the terminals of the oscillator is measured, after which the oscillator is raised a few feet and the operation repeated. If the impedance remains the same, it indicates that the oscillator is still adjacent the same stratum or formation. If it is different, then it is manifest that a different layer, or stratum, has been reached. By successively raising the oscillator and exciting the same at each stage of the ascent, it is possible to accurately determine the changes in formation. By correlating the impedance values with the different types of formations or layers, it is possible to ascertain, by such measurements, the nature and characteristics of said formations. In this manner, an accurate log of the bore 10 may be obtained. Although it is preferable to start the measurements from the bottom of the bore, the operation may be reversed.

As has been pointed out, various well known methods of making the impedance measurements may be employed and in Figure 2 an alternative method is shown, wherein a cathode ray oscillograph 18, which has been shown schematically, is utilized. As is well known, a cathode ray oscillograph is an instrument for making quantitative measurements on the magnitude of two electrical quantities, together with their phase relationship. In using the oscillograph, the alternating current flowing through the oscillator 11 is caused to produce a deflection, proportional to said current, on a pair of deflection plates 19 of the oscillograph whereby a deflection, proportional to the current, of said plates is effected. The voltage across the oscillator terminals acts upon the second pair of deflection plates 20, whereby the latter are deflected in accordance with said voltage. The plates 19 are, of course, disposed at a right angle to the plates 20 and the resultant wave form produced on the screen or face 21 by the deflecting plates, gives the numerical magnitude and angle of phase between the current flowing through the oscillator 11, as indicated by the line 11a on the screen 21, and the voltage across the terminals of the oscillator, as indicated by line 11b. From these quantities, the impedance, and likewise the power delivered to the oscillator may be readily determined.

In Figure 3, another method of determining the nature and properties of subsurface formations, by means of seismic or sound waves, is shown. In this method, an electromagnetic oscillator 25 is carried by the lower end of a cable 26 and is arranged to be excited by an alternating current delivered to the same by wires or conductors 27 and 28. This oscillator may be of the same construction as the oscillator 11, and is excited by an alternator 29 of variable frequency, which alternator is connected to the wires 27 and 28, whereby the alternator excites the oscillator, a sound is generated and transmitted into the formation. The oscillator 25 is hereinafter referred to as the transmitting unit.

A receiving unit 30 which may be of an electromagnetic device of the same construction as the transmitting unit, is adapted to be lowered on a cable 31. Suitable conductors or wires 32 and 33 lead from the unit 30 extending upwardly through the cable.

The transmitting unit 25 and the receiving unit 30 are lowered into the bore 10 to the desired position and are properly spaced from each other. The spacing therebetween is determined by the geologic conditions. The alternator 29 is operated to excite the transmitting unit 25 so that sound is generated and transmitted into the formation adjacent said unit. The sound waves penetrate the formation and travel therethrough. It is well known that velocity of sound travel through a formation in situ is relatively greater than the velocity of sound travel through the column of fluid in which the units 25 and 30 are submerged and therefore, the sound will travel from the unit 25 to the receiving unit 30 through the formation at a greater velocity than the sound travelling through the column of fluid with the result that the sound which passes through the formation will arrive at the receiving unit first. A sound wave, arriving at the electromagnetic receiving unit 30 produces an electric voltage therein which is transmitted by the wires 32 and 33 to the measuring equipment at the surface, as will be explained. By ascertaining the phase angle between the terminal voltage of the transmitting unit 25 and that of the receiving unit 30, it is possible to calculate the time required for the transmission of sound from the unit 25 to the unit 30 by way of the geologic formation, and knowing the distance between the units, the velocity of propagation or transmission of sound may be readily computed. This velocity, as has been pointed out, varies with the type of formation and, thus, changes in the formations may readily be determined.

For ascertaining the phase angle between the terminal voltage of the transmitting unit and that of the receiving unit 30, the wires 27 and 28 are connected, by wires 27' and 28' with the deflecting plates 20 of the cathode ray oscillograph 18, whereby the voltage applied to the unit or oscillator 25 is constantly indicated on this pair of plates. The voltage applied by the receiving unit 30 is conducted to the second set of deflecting plates 19 by means of the wires 32 and 33, which are connected to said plates. The deflection of the plates caused by the voltage applied by the receiving unit 30, indicates the magnitude and relative phase position of this voltage.

The phase angle between the terminal voltage of the transmitting unit 25 and that of the receiving unit 30 is determined, at a given frequency, by the time required for the transmission of sound from the unit 25 to unit 30 by way of the geologic formation and, therefore, the phase angles between these two voltages is indicated by the figure on the screen or face 21 of the cathode ray oscillograph. The time of transmission is thus measured and since the operator knows the distance between the units 25 and 30, the velocity of propagation or transmission of sound through the formation may be calculated and determined, with the result that the nature of the formation may be ascertained.

In performing the method with this apparatus, the units 25 and 30 are moved into successive mean positions, with measurements being taken at each position, as in the first form. Of course, the device could be continuously moved throughout the length of the bore with continuous measurements taken during such movement. In order to obtain confirmatory information upon the measurements, the impedance bridge 16 may be connected in the alternator circuit as shown. However, it is noted that this bridge is not essential and may be eliminated.

If it is desired to maintain a further check on the measurements taken, a second receiving unit 35 (Figure 3), similar to unit 30, may be located at the surface of the ground. This receiving unit 35 will receive the sound from the transmitting unit 25 after the sound has travelled vertically through all of the geologic formations or layers between said unit and the unit 25. Since the total time of travel from the oscillator 25 to the receiving unit 35 embraces the sum of all of the individual measurements previously made by the units 25 and 30, it will be seen that the records obtained by the unit 35 may be compared to check the previous indications so as to check on the sum of the individual quantities. Similarly, it would be possible to check the measurements taken by the units 25 and 30 by locating a transmitting unit or generator (not shown) at the surface and receiving the sound waves with a receiver in the bore. This latter method would be preferable where the sound must be transmitted through several thousand feet as it would be difficult to lower a generator, of sufficient capacity to send the sound to the surface, into the bore 10. Either of these methods of checking may be embodied in any of the methods disclosed.

There are many forms which the oscillators 11 and 25 and the receiving units 30 and 35 may take and, if desired, they may all be of identical construction. As previously pointed out, the usual electromagnetic oscillator arranged to be excited by an alternating current of variable frequency has been found suitable; however, the invention is not to be limited to a sound generator of this type as it is clearly within the scope of the invention to employ a generator which does not emit continuous waves. In such instance, the generator may be constructed to deliver a sudden mechanical impact against the formation, whereby the impact, consisting of a single sharp blow, causes a transient sound wave of steep wave front to penetrate into the formation. This form is clearly shown in Figure 4, whereby an electrical solenoid 40 is provided with a pair of armatures 41. The inner ends of the armatures are connected by a spring 42 which urges the same outwardly. When the solenoid is energized, the armatures are retracted under tension of the spring and when de-energized, said spring moves the armatures outwardly, whereby they strike the formation to deliver a sudden blow. The solenoid may be mounted within a suitable housing 43 which may be of a shape which facilitates its movement through the bore. The instant of the generation of the blow may be indicated on a recording oscillograph and the arrival of the wave at the receiver, after travel through the formation, produces thereon a transient voltage wave. The resultant transient wave pattern on the oscillograph indicates, at once, the time of transmission of the sound through the formation.

Although it has been found that the cathode ray oscillograph is satisfactory in indicating the measurements desired, other means may be used. For example, a recording oscillograph, wherein the transients are permanently recorded on a photographic film, may be employed to provide a permanent record; or the transmission time in the transient case may be measured by the embodiment of the customary sweep circuit on one of the oscillograph axes and the deflection by either the transmitter 25 or receiver 30 on the plates normal to the sweep circuit.

The methods hereinabove set forth may be employed for making a frequency run in the vicinity of any particular layer or stratum. In such instance, the transmitter is lowered opposite the desired stratum and sound generated over a wide range of frequencies. Measurements are taken at each frequency and the sound transmission characteristics of the stratum noted, whereby the physical and lithologic properties of the stratum are indicated.

The foregoing description of the invention is explanatory thereof and various well known measuring instruments may be substituted for those illustrated and described herein; also various changes in the elements, as well as the details of the illustrated construction, may be made, within the scope of the appended claims, without departing from the spirit of the invention.

What I claim and desire to secure by Letters Patent is:

1. A system for making acoustic impedance measurements in a bore hole, which comprises an acoustic oscillator located in said bore hole for transmitting sound waves corresponding in frequency to that of the impressed alternating current, a source of alternating current of variable frequency, an alternating current impedance measuring bridge, having a plurality of variable impedance arms, and one arm being said acoustic oscillator, whereby a group of acoustic impedance measurements may be made over a frequency range to determine the physical lithological properties of the formation around the bore hole.

2. A system for making sound transmission characteristic measurements in a bore hole, comprising an acoustic oscillator in the bore hole, means for impressing upon said oscillator alternating current, the frequency of which may be varied, and means for measuring the alternating current acoustic impedance of the acoustic oscillator at the frequency at which said acoustic oscillator is made to oscillate by the alternating current source, whereby the physical and lithologic properties of the formation around the bore hole may be ascertained.

ROLAND F. BEERS.